United States Patent [19]
Lipner et al.

[11] Patent Number: 5,553,304
[45] Date of Patent: Sep. 3, 1996

[54] METHOD FOR GENERATING AND EXECUTING COMPLEX OPERATING PROCEDURES

[75] Inventors: Melvin H. Lipner, Monroeville; Francine S. Pitcairn, Pittsburgh; Roger A. Mundy, North Huntingdon, all of Pa.

[73] Assignee: Westinghouse Electric Corporation, Pittsburgh, Pa.

[21] Appl. No.: 337,580

[22] Filed: Nov. 10, 1994

Related U.S. Application Data

[63] Continuation of Ser. No. 821,734, Jan. 17, 1992, abandoned.

[51] Int. Cl.$^6$ ................................................. G06F 17/30
[52] U.S. Cl. ................. 395/600; 364/221; 364/221.9; 364/224.9; 364/267.2; 364/266.6; 364/DIG. 1; 395/700; 395/183.07
[58] Field of Search ........................... 395/600, 700, 395/575; 364/550, 551.01, 221, 221.9, 224.9, 267.2, 266.6, 273.5

[56] References Cited

U.S. PATENT DOCUMENTS

| | | | |
|---|---|---|---|
| 4,459,259 | 7/1984 | Colley | 376/216 |
| 4,628,434 | 12/1986 | Tashiro et al. | 395/54 |
| 4,740,886 | 4/1988 | Tanifuji et al. | 395/922 |
| 4,796,179 | 1/1989 | Lehman et al. | 364/300 |
| 4,815,014 | 3/1989 | Lipner et al. | 364/550 |
| 5,006,992 | 4/1991 | Skeirik | 364/513 |
| 5,009,833 | 4/1991 | Takeuchi et al. | 376/217 |
| 5,063,523 | 11/1991 | Vrenjak | 395/200 |
| 5,068,080 | 11/1991 | Impink, Jr. et al. | 376/215 |
| 5,084,813 | 1/1992 | Ono | 395/922 |
| 5,177,420 | 1/1993 | Wada et al. | 318/568.11 |
| 5,179,701 | 1/1993 | Chisholm | 395/600 |
| 5,325,522 | 6/1994 | Vaughn | 395/600 |

FOREIGN PATENT DOCUMENTS

| | | | |
|---|---|---|---|
| 0170515 | 5/1986 | European Pat. Off. | G06F 17/00 |
| 0216356 | 1/1987 | European Pat. Off. | G05B 23/02 |
| 0315833 | 1/1990 | European Pat. Off. | G01R 13/06 |

*Primary Examiner*—Thomas G. Black
*Assistant Examiner*—Hosain T. Alam

[57] ABSTRACT

The present invention is a method for monitoring the operation of a nuclear power facility by generating a composite equation from a relational database which at execution time represents paper procedures. After generating the composite equation, a program stack is compiled on-line from the composite equation. Then, the program stack is executed and sensors are monitored to determine whether an emergency situation has occurred in the facility. When a determined violation has occurred, corrective actions are displayed for a plant operator to execute in order to correct the problem.

22 Claims, 7 Drawing Sheets

FIG. 2A

PROCEDURE EO

1. VERIFY S.G. TUBE RUPTURE
   a. PUMP A            RUNNING
   b. PRESSURIZER LEVEL    GREATER THAN 50%
   c. S.G. PRESSURE        LESS THAN 1000psia

FIG. 5

RESULTING EQUATIONS

EO: 1: a: = ABC123 = 1
EO: 1: b: = DEF456 > 50
EO: 1: c: = GHI789 < 1000

PROGRAM STACK 210

```
EO: 1: a
=
1
ABC123
EO: 1:b
>
50
DEF456
EO: 1: c
<
1000
GHI789
EO: 1
&
&
EO: 1: c
EO: 1: b
EO: 1: a
```

FIG. 2B

STEPS TABLE

| PROCEDURE # | STEP # | SUBSTEP # | OR_FLAG | DSS ENTITIES KEY |
|---|---|---|---|---|
| EO | 1 | | | |
| EO | 1 | a | | 1 |
| EO | 1 | b | FALSE | 2 |
| EO | 1 | c | FALSE | 3 |

DSS ENTITIES TABLE

| DSS ENTITIES KEY | DESCRIPTOR # | POS. STATE # | NEG. STATE # | SETPOINT |
|---|---|---|---|---|
| 1 | 8 | 12 | 16 | |
| 2 | 10 | 13 | 18 | 50 |
| 3 | 12 | 14 | 19 | 1000 |

DESCRIPTORS TABLE

| DESCRIPTOR # | DESCRIPTOR NAME | COMPUTER VARIABLE NAME | UNITS # |
|---|---|---|---|
| 8 | PUMP A | ABC123 | |
| 10 | PRESSURIZER LEVEL | DEF456 | 3 |
| 12 | S. G. PRESSURE | GHI789 | 6 |

POSITIVE STATES TABLE

| POSITIVE STATE # | POSITIVE STATE | STATE EQUATION |
|---|---|---|
| 12 | RUNNING | [COMPUTER VARIABLE NAME] = 1 |
| 13 | GREATER THAN | [COMPUTER VARIABLE NAME]>[SETPOINT] |
| 14 | LESS THAN | [COMPUTER VARIABLE NAME]<[SETPOINT] |

NEGATIVE STATES TABLE

| NEGATIVE STATE # | NEGATIVE STATE |
|---|---|
| 16 | NOT RUNNING |
| 18 | NOT GREATER THAN |
| 19 | NOT LESS THAN |

UNITS TABLE

| UNITS # | UNITS NAME |
|---|---|
| 3 | % |
| 6 | psia |

METHOD FOR GENERATING AND EXECUTING COMPLEX OPERATING PROCEDURES

This application is a continuation, of application Ser. No. 07/821,734 filed Jan. 17, 1992 now abandoned.

CROSS REFERENCE TO RELATED APPLICATIONS

The present invention is directed to a COMputerized PROcedures (COMPRO) system as described below and of which various aspects have been described in U.S. Pat. Nos. 4,803,039, 4,815,014, and 5,068,080; and U.S. application Ser. No. 213,057 filed on Jun. 29, 1988, U.S. application Ser. No. 479,007 filed Feb. 9, 1990 and allowed, U.S. application Ser. No. 468,656 filed Jan. 23, 1990 and abandoned, U.S. application Ser. No. 674,480 filed Mar. 25, 1991 and abandoned, and U.S. application Ser. No. 772,826 filed Oct. 7, 1991 now U.S. Pat. No. 5,253,186; all incorporated by reference herein.

BACKGROUND OF THE INVENTION

1. Field of the Invention

This invention generally relates to a method for generating and executing complex COMputerized PROcedures (COMPRO) which monitor the operation of a nuclear power facility and, more particularly, for generating equations representing conditions or states of the facility and executing the equations to determine whether the facility is operating within the design conditions and whether an emergency exists.

2. Description of the Related Art

COMPRO is a computerized information and control system primarily intended to be used to assist facility operators in monitoring and controlling the execution of plant procedures, including for example emergency operating, normal operating, abnormal operating and alarm responses. COMPRO allows facility operators to access and follow procedures in an easy and logical manner. At the same time, the COMPRO system provides the facility operators with parallel information to allow them to assess the overall status of the process or facility. COMPRO may be used for all types of plant operating procedures. Most plant operating procedures are well suited for automation since a computer can easily monitor many parameters concurrently. By presenting information in parallel, COMPRO helps plant operators to see where they are with respect to the overall plant response.

Formal written plant operating procedures under either normal or emergency conditions for a nuclear power plant are developed well in advance by experienced specialists. These procedures are not only intended to guide a facility operator along a recommended course of action but also to detect anomalous conditions and to recommend changes in the normal course of action to deal with these anomalies.

COMPRO or the interactive computer based monitoring of the execution of complex operating procedures is well established and has resulted in issued patents, for example, U.S. Pat. Nos. 4,803,039, 4,815,014 and 5,068,080. After the design of the basic system to execute complex operating procedures, the subsequent patents and patent applications have focused on enhancements to the basic system and have not addressed the fundamental software structure of the basic system.

The design of the basic software had system parameters (valves, pumps, generators) and conditions hard-coded into the software. For example, feed water valves may operate above a certain flow condition, such as 100 feet/second. This condition was hard-coded into the system software, for example as "If valve-input>100 then valve-condition= True". The software was compiled resulting in executable source code explicitly including the decision making steps.

However, if one parameter had to be changed, the system source code would also have to be changed and thus, would also require a recompilation of the source code for the entire system. The recompilation was costly because of the editing, testing, and verification and validation required in this type of implementation of the COMPRO system. Moreover, system designers had the arduous task of writing and maintaining potentially thousands of lines of computer code.

SUMMARY OF THE INVENTION

It is an object of the present invention to build and execute equations at run-time to monitor the operation of a facility.

It is another object of the present invention to modify conditions without recompiling the system source code.

It is also an object of the present invention to use a relational database to store components of the equations and logical relationships between the equations and to use these relationships to generate equations.

It is a further object of the present invention to generate composite and singular equations from a relational database which indicates the physical characteristics and conditions of a facility.

It is another object of the present invention to monitor and sequence through a procedure by each of its steps, while concurrently monitoring parallel information which indicates the overall operation of the facility.

It is also an object of the present invention to guide a facility operator in resolving any violations (either related to a step or a piece of parallel information).

The above objects can be attained by a method which utilizes a relational database and management system to store procedure information including descriptors, logical states and setpoints. The descriptors, states and setpoints are concatenated together to form singular and composite equations which represent how sensor data will be evaluated. Once the equations are generated, they are individually parsed and compiled to form an executable representation. Compiled entry condition equations are evaluated and monitored to determine whether a violation of the facility has occurred. Once a violation occurs, a predetermined course of action or a procedure is recommended by COMPRO which is displayed to a facility operator. The system continuously monitors and evaluates equations and will only proceed to the next procedure/step when the facility operator responds to a prompt.

Components of the procedural information equations act as input to the system program instead of residing as code in the program. Thus, changes can be made to the equations without requiring changes to the software code. Isolating all procedural information, including components of the equations, which is subject to change from the software code, will eliminate the need for modifying the source code when procedural information or setpoint values are changed.

The advantages to this system are clear. This invention reduces the overall complexity of the system by storing procedural knowledge and setpoints in a relational database.

This facilitates system maintenance since it is far easier to modify procedural information stored in a relational database than source code. This invention also facilitates the customizing of a user interface, and permits direct application to foreign languages since character strings in the database may be entered in any language.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2A shows one of the many procedure steps implemented in the COMPRO system;

FIG. 2B shows a procedure step stored as a series of tables in the relational database;

FIG. 5 shows examples of character strings of concatenated singular equations and a concatenated composite equation;

FIG. 6 shows a program stack;

DESCRIPTION OF THE PREFERRED EMBODIMENTS

Figure 1:
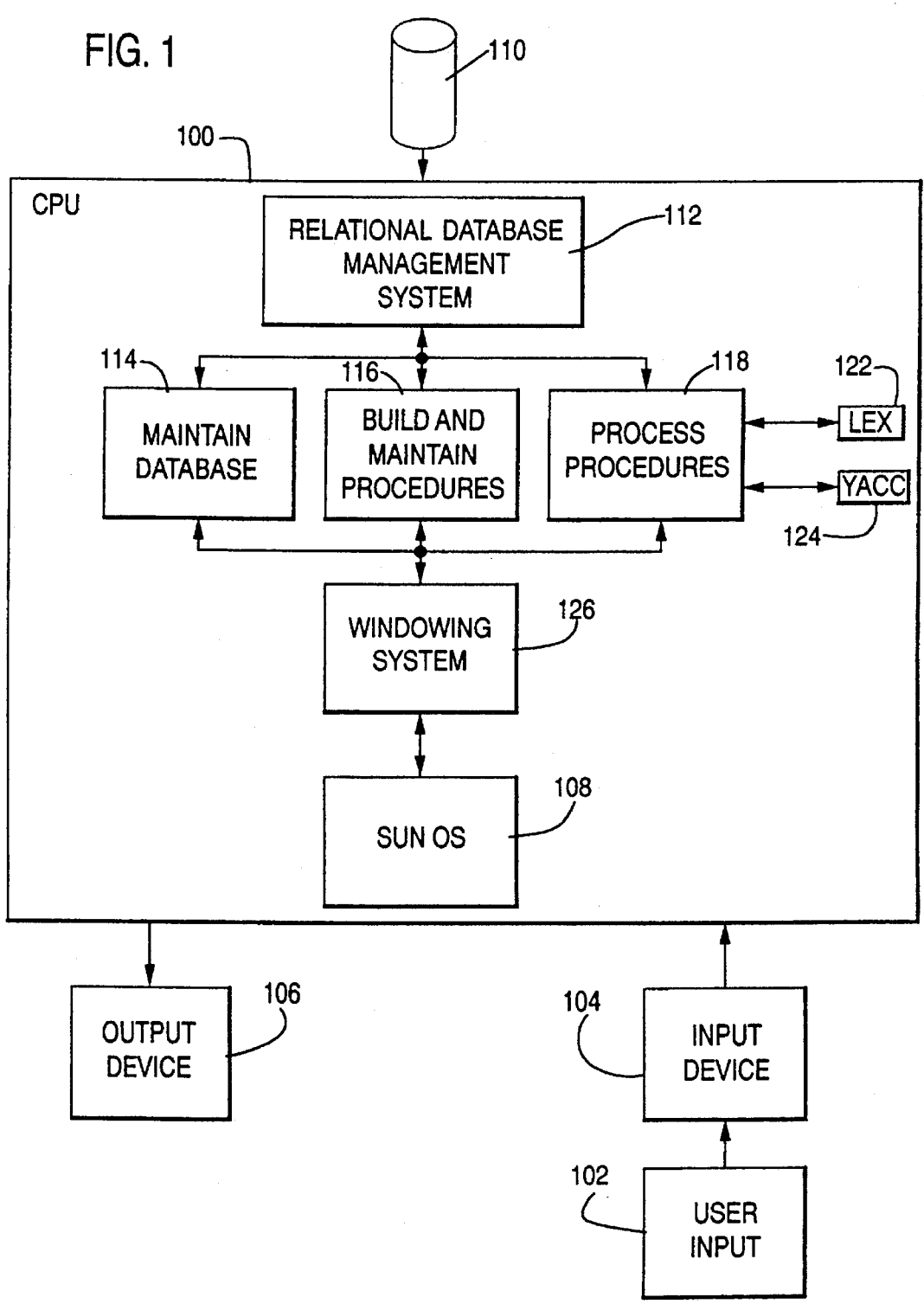
FIG. 1 is a block diagram of the system according to the present invention.

An overview of the system hardware and software modules is shown in FIG. 1. The software modules are preferably executed on a commercially available Sun Micro Systems workstation (Sun-3 or Sun-4 workstation), shown as CPU 100. User input 102 is input to CPU 100 by input devices 104 such as a mouse, keyboard or a touch display which is able to sense or detect a human touch. CPU 100 outputs to output devices 106 such as a printer or a display. The operating system of CPU 100 is preferably the SUNOS$^R$ 108 (version 3.0.3). CPU 100 stores procedural information in a relational database on a disk storage device 110 using a relational database management system 112.

A relational database is a collection of related information. The relational database in accordance with the present invention includes a series of tables which are logically interrelated. An example is shown in FIG. 2A of one of a plurality of procedures comprising a plurality of steps, each step including a plurality of equations which are stored in the relational database. FIG. 2B shows step 1 of Procedure EO of FIG. 2A stored as a series of tables in the relational database.

In FIG. 2A, step 1 of Procedure EO is evaluated to verify whether a steam generator tube has ruptured. Substep a of Procedure EO step 1 first examines the pump A running indicator to see if pump A is running. Next, substep b of Procedure EO step 1 examines a pressurizer sensor which indicates a pressurizer level of the steam generator to determine whether it is greater than 50%. Finally, the steam generator pressure sensor is read to see if the pressure is less than 1000 psia. Step 1 of Procedure EO indicates that the steam generator tube will have ruptured if a) Pump A is running; and b) the pressurizer level is greater than 50%; and c) the steam generator pressure is less than 1000 psia. That is, the tube will have ruptured only if all equations are true. COMPRO then provides a facility operator with steps which are displayed on the output device 106 and the operator can perform the steps to correct the rupture of the steam generator tube, such as stopping Pump A from running.

FIG. 2B shows partial contents of a Steps Table which stores procedure numbers, such as EO, step numbers, substep numbers, (DSS) Entities Keys and OR_Flags. A procedure includes steps and steps include substeps. Substeps can also include subsubsteps but are not shown in this example.

The DSS Entities Keys of the Steps Table, as illustrated in FIG. 2B, point to entries in the DSS Entities Table. The DSS Entities Table comprises a descriptor number, a positive state and a negative state, and a setpoint. The descriptor number points to an entry in the Descriptor Table. The Descriptor Table comprises a descriptor name, a computer variable name for the descriptor and a units number which points to a Units Table. The positive state and negative state number of the DSS Entities Table point to entries in the Positive States Table and Negative States Table respectively. The setpoint column in the DSS Entities Table comprises numbers.

The Positive State Table comprises positive state numbers, positive states and state equations. The positive state number is pointed to by the positive state number in the DSS Entities Table and identifies a row of the Positive State Table. The Positive State is a description of the positive state of the represented logical state, such as "Greater Than" or "Less Than", and is used for display purposes only. The State Equation identifies a form of the equation to be evaluated by defining each component of the equation, such as [Computer Variable Name]<[Setpoint] for example.

The Negative State Table comprises Negative state numbers and Negative states. The negative state number is pointed to by the negative state number in the DSS Entities Table. The Negative State is a description of the negative state of the represented logical state, such as "Not Greater Than" or "Not Less Than", and is used for display purposes only.

The Units Table comprises units numbers and units name. The unit number is pointed to by the units number in the Descriptors Table. The Units Name is the units of the descriptor, such as psia for example, and are used for displaying purposes only.

According to the Steps table, procedure EO, step 1, includes only three substeps a, b and c. Each of the substeps is an equation which are formed according to the contents stored in the other Tables. Each of the equations formed represent the condition of procedure EO, steps 1, substeps a, b and c respectively, shown in FIG. 2A. The DSS Entities Key points to the DSS Entities Table which describes the relationship between each of the tables shown in FIG. 2B to form the equations.

A relational database management system 112, such as INGRES™ or ORICLE which are commercially available software systems, aids in the management of the information stored in the tables shown in FIG. 2B. INGRES™ automatically provides four functions: 1) accept data and instructions from users; 2) retrieve information from the database; 3) update the database; and 4) format and output data to users.

The availability of these functions reduces the coding effort required to manipulate a database. A person having ordinary skill in the art familiar with INGRES, UNIX and the C Language can provide appropriate software to use such functions to, for example, access, load and maintain a database such as shown in FIG. 2B.

INGRES™ helps to store and retrieve all the data required to generate a procedure, such as entry conditions, steps, substeps, descriptors, states and setpoints. Facility specialists use INGRES™ functions to store the procedural information in tables as described above and to specify the linked association or relationship between the tables as shown in FIG. 2A. INGRES™ also provide other functions, such as viewing the current contents of the database, searching for specific data, making modifications to the data, deleting old data and adding new data. Various reporting options are available in INGRES™ to produce hardcopy reports of the database content.

In addition to automatically providing the ability to retrieve, append, modify and delete data, INGRES™ also ensures data integrity. Data consistency is automatically protected during updates and an ongoing journal of all database activity is kept so that the database can be fully restored to it original state in case of a software or hardware failure. Validation checks by INGRES™ also protect the integrity of the database. Every update can be checked against a set of constraints that are set by system design specialists to ensure valid entries.

This invention, as illustrated in FIG. 1, has three main software modules: 1) Maintain the relational database 114 (Maintain 114); 2) Build and Maintain Procedures 116 (Build 116); and 3) Process Procedures 118 (Process 118). These three software modules assist a facility operator in generating procedures and executing the procedures by converting what is stored in a database into executable software equations. Each of these three software modules are preferably written in the C language with embedded SQL (Standard Query Language).

The three software modules are each independently executable programs. Maintain 114 and Build 116 preferably run off-line which means that these modules are executing before actual execution of the system software. Process 118 is executed on-line when the actual monitoring of the nuclear power facility begins. Process 118 utilizes commercially available UNIX™ utilities such as lex 122 and yacc 124 for formulating and compiling equations from the data stored in the relational database and for executing the equations at run-time. Lex 122 and yacc 124 are instrumental in compiling the equations at run-time rather than compiling the equations when the system source code is compiled. Lex 122 is a generator of lexical analyzers, and yacc 124 is a compiler writing system. Those of ordinary skill in the art understand how to use these utilities to parse and compile strings.

The software modules also utilize a Windowing system 126, such as the commercially available Windows 4GL for off-line data inputting and outputting and, Open Windows for executing the process procedures module 118. Windows 4GL assists a facility specialist in Build 116 to communicate with the INGRES™ relational database. Windows 4GL communicates with SunOS 108 to permit facility specialists to build user interface forms to input data into and retrieve data from the relational database. Windows 4GL facilitates window management for programmers by providing visual editors which allow programmers to design and test forms and menus interactively, generating any number of windows within an application, interactively place fields, buttons, bitmaps and other visual elements in windows, and other functions. Maintain 114 uses UNIX™ scripts to update the database.

Software module Maintain 114 is a utility to assist a database manager in performing routine maintenance operations on the database and the disk storage device 110, such as journaling and checkpointing, to ensure the integrity of the database stored on disk storage device 110 and whether the database is up-to-date. Maintain 116 does not verify the entries in the relational database but ensures that the database itself is current and not changed by a person having unauthorized access. If the database is not correctly maintained, the execution of complex operating procedures will likewise be inaccurate. Therefore, the accuracy of the database is an essential part of a proper execution of the system. One having ordinary skill in the art can utilize database maintenance functions previously mentioned and available through UNIX scripts using INGRES commands to perform the Maintain 114 operations.

Software module Build 116 is a facility to load procedural information in the relational database so that it can be executed in Process 118. The procedural information to be entered includes, for example, step numbers, substep numbers, descriptor names, computer variable names, setpoints, units, etc, as shown in FIG. 2B. The facility specialists use a series of forms which are displayed by the Windowing system 126. The forms will organize procedural information so that similar information will be part of the same form. One having ordinary skill in the art can load procedural information into the database using commercially available functions as previously discussed and executable or available through the INGRES.

Figure 3:
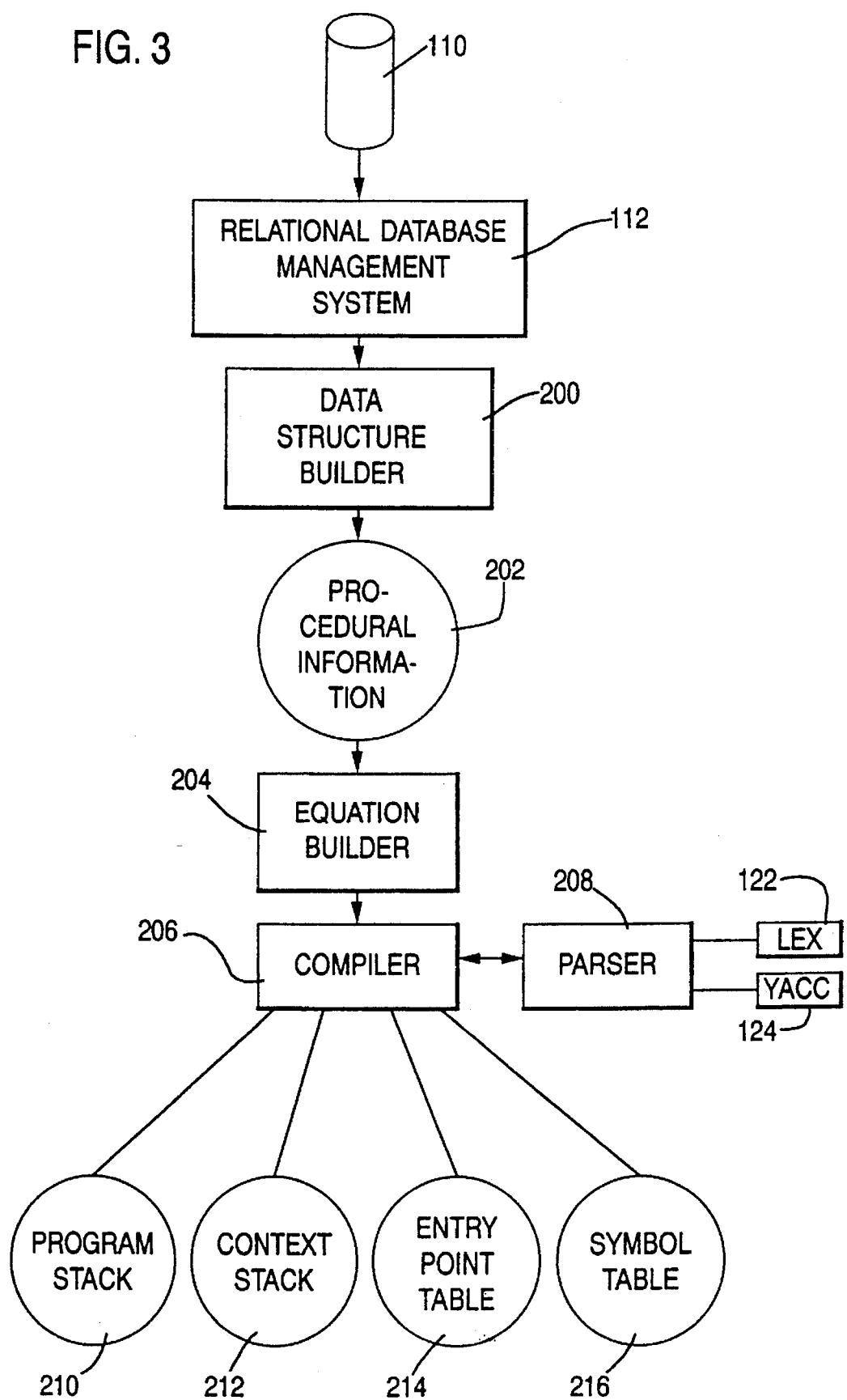
FIG. 3 is a block diagram of the generation and execution of equations.

Software module Process 118 represents the on-line processing function of the COMPRO system. Process 118 encompasses generating and executing complex operating procedure equations to monitor a nuclear power facility. The diagram in FIG. 3 illustrates software modules of process 118 for generating executable software equations. Data structure builder 200 generates procedural information 202 from the relational database from disk storage device 110 via the relational database management system 112.

Data structure builder 200 essentially copies the database contents stored on disk storage device 110 into local memory. The reason for copying the database contents into local memory is to reduce the time it would take to traverse the database stored on disk storage device 110. Data structure builder 200 would not be needed if the INGRES relational database had faster on-line accessing capabilities. The C data structures are easily traversed so the system will not be slowed. Therefore, local memory is defined by using and the data from the relational database is stored in C language data structures, such as "struct" and pointer or "char *pointer" for example, which implement table type structures and maintain the interrelationship between the tables while providing memory for storing procedural information. That is, the table arrangement of FIG. 2B used for relational database storage is maintained in the local memory.

The database tables and the associative information, such as interrelationships among the tables, are read from disk storage device 110 using commands, for example SELECT, provided by SQL and INGRES. Both the tables and the relationships between the tables stored in the relational database are predefined by facility specialists according to each application. These tables are read into local memory by utilizing C data structure constructs. For example, a facility specialist would create and define a table, such as the Steps Table shown in FIG. 2B, by creating and labelling each of the columns and inserting the appropriate data into each row, column. One having ordinary skill in the art can examine the Steps Table and make a corresponding C language data structure to hold this information.

This same process would be repeated for every table stored in the relational database. Then, the contents of the table stored in the disk storage device 110 are read using the SQL command SELECT, for example, and stored into the corresponding C data structure. Therefore, one having ordinary skill in the art can define C data structures and C/UNIX software with facilities provided by INGRES and SQL to copy the data from the database stored on disk storage device 110 into local memory. Any place in the table where there is no entry, a zero or a C language "null" will be entered or defaulted to initially when the Process 118 module begins executing.

Figure 4:
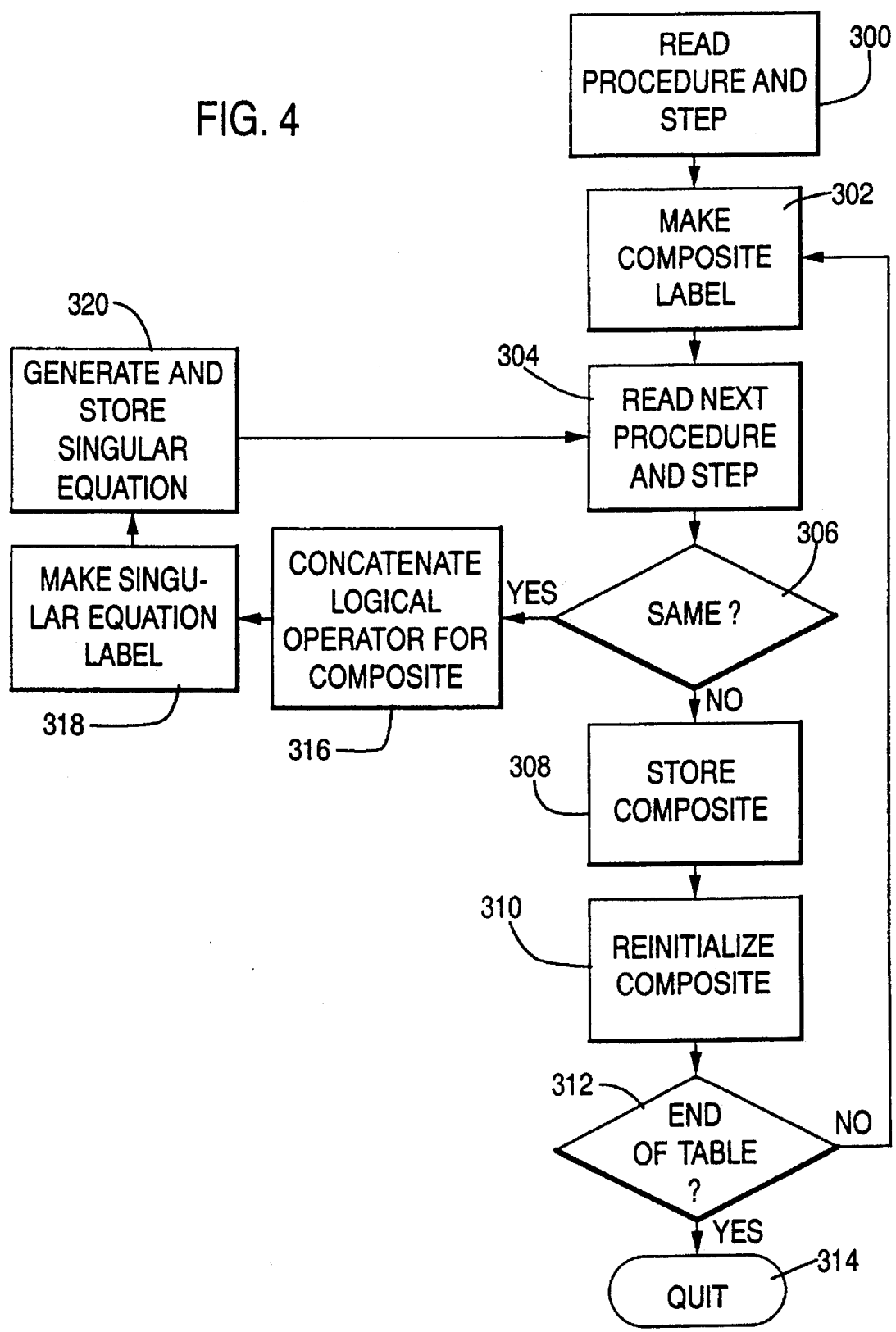
FIG. 4 is a flowchart illustrating the operation of an equation builder.

After the data structure builder 200 stores the database contents in local memory, Equation Builder 204 then builds each of the equations or mathematical expressions as shown in the flowchart illustrated in FIG. 4. The Equation Builder 204 as shown in FIG. 4 builds each of the equations which were previously hard-coded into the system software.

There are two types of equations: composite equations and singular equations. A composite equation is comprised of singular equations. For each of the conditions (substeps a, b and c) shown in FIG. 2A for procedure E0, step 1 a corresponding singular equation is made by concatenating a descriptor, a logical state and, if needed, one or more setpoints together.

A descriptor represents one of the many valves, pumps, generators, trip breakers, or similar physical features of a nuclear power plant which is stored in the relational database. For example, the descriptor for the condition shown in FIG. 2A, procedure E0, step 1, substep a, is "Pump A". Similarly the descriptor for the conditions of procedure E0, step 1, substeps b and c are "Pressurizer Level" and "Steam Generator (S.G.) Pressure" respectively. The descriptors are stored in a Descriptors Table C data structure under the Descriptor Name. The Descriptors Table C data structure is pointed to by the Descriptor number stored in the DSS Entities Table C data structure, which is pointed to by the DSS Entities Key of the Steps Table C data structure. The Computer Variable Name stored in the Descriptors Table C data structure represents a unique identifier for a sensor value obtained when the facility sensors are scanned.

The logical state for each of the equations represents how the descriptor relates to setpoint values. The logical state can be for example, <, >, =, AND and NOR, etc. The logical state for procedure E0, step 1, substep b shown in FIG. 2A is "greater than". The logical state for Procedure E0, step 1, substep a is either true or false because the pump will either be running or not running, which is determined by only examining the on/off switch sensor of Pump A.

The Positive States Table data structure shown in FIG. 2B, stores a state equation for each of the equations. The state equation defines the form of the equation by defining what components are being compared and a logical operator used to perform the logical comparison between the components, such as "<" for example. As shown in FIG. 2B, an example of the logical state (State Equation) of procedure E0, step 1, substep b is a ">" in contrast to procedure E0, step 1, substep c which is a "<" logical state.

The setpoint value of the DSS Entities Table is a number representing a condition at which the corresponding descriptor will either be true or false. As shown in FIG. 2A, the setpoint values for procedure E0, step 1, substeps b and c and are stored in the DSS Entities Table C data structure as 50 and 1000 respectively, under Setpoint.

Equation builder 204 begins by searching the C data structure 300 for each occurrence of an equation associated with a step and substep. For example, a pointer points to a C data structure "struct" table, such as the Steps Table shown in FIG. 2B for example. The C data structure for the procedure number and step number are read and stored as variables.

A label for the composite equation is generated 302 by Equation Builder 204. For example, the first procedure number is read from the Steps Table C data structure. The procedure number is stored in a composite equation character string which is followed by a ":". The step number is read from the Steps Table data structure, converted into a character string and stored after "E0:" in the composite equation character string. A ":=" is inserted after the step number in the composite equation character string, giving "E0:1:a:=" where E0:1:a is a label which will store the result of the equation.

The next procedure and step number are read 304 from the C data structure and compared 306 to the variable procedure number and step number. If either the procedure or step number is different, then this would indicate the end of the composite equation. The composite equation would then be stored 308 in a file (not shown). This file, which will contain all singular and composite equations, will be sent to a parser and compiler. The composite character string will be set to C language "null" 310. If the procedure and step number point to the end of the Steps Table C data structure 312, as indicated by a C language construct, then the Equation Builder quits 314. Otherwise, the Equation Builder makes a label for the next composite equation 302.

If the next procedure number and step number are the same 306, then the logical operator for the composite equation is read and stored in the composite character string 316. For example, the OR_Flag entry stored in Steps Table C data structure for procedure E0, step 1, substep a is read. If the result is a C language "null" then nothing is appended to the end of the composite equation character string. If the result is true, the character symbol "|" (OR logical operation) is appended to the end of the composite equation character string. If the result is false, the character symbol "&" (AND logical operation) is appended to the end of the composite equation character string. In this example, the OR_Flag is null. Nothing is appended to the end of the composite character string at this time.

Next, a label is generated for a singular equation 318. For example, a pointer will point to the entries in the Steps Table C data structure which indicates an equation representing procedure E0, step 1, substep a. A label for a singular equation is generated 318 by reading the procedure number character string "E0" from the C data structure and stored it in the variable character string. "E0" is also appended to the end of the composite equation character string. A ":" is then entered in the next available space of the variable character string and composite equation character string. The step number is read from the Steps Table data structure, converted into characters and stored next in the next locations in the variable and composite character strings. Another ":" is inserted in the next location in the variable and composite equation character strings. The substep number is then read from the Steps Table data structure and stored in the variable and composite equation character strings. A ":=" is stored in the variable equation character string after the substep number. Every equation will begin with a label comprised of the procedure and step number, and if not a composite equation, the substep number. The label is used by the parser and compiler to store the result of the equation. A ":" will separate each of these numbers represented as characters.

A descriptor, logical operator and one or more setpoints are concatenated together to form a singular equation 320. For example, a positive state number, is read from the DSS Entities Table C data structure based on the DSS Entities Key pointer and value. The positive state number in the DSS Entities Table C data structure is a pointer to the value of the positive state number stored in Positive States Table. Based on the positive state number pointer and value, the state equation is read into a character string. If the state equation character string contains [Computer Variable Name], the Computer Variable Name is read from the Descriptors Table C data structure and substituted for [Computer Variable Name]. If the state equation contains [Setpoint], the setpoint is read from the DSS Entities Table C data structure and substituted for [Setpoint]. The state equation character string is then stored in the variable character string. This concatenated character string equation, therefore, contains a descriptor, logical operator and setpoint.

In this example, the Computer Variable Name is read by reading the DSS Entities Key which is a pointer to a DSS Entities Key value in the DSS Entities Table. This pointer will point to the first set of entries in the DSS Entities Table. Based on the DSS Entities Key pointer and value, the descriptor number stored in the DSS Entities Table C data structure is read. The descriptor number in the DSS Entities Table data structure is a pointer to the value of the descriptor number stored in the Descriptor Table C data structure. Based on the Descriptor number pointer and value, a computer variable name stored in the Descriptor Table C data structure is read and substituted into the state equation character string.

In this example, the setpoint value is read from the DSS Entities Table C data structure based on the DSS Entities Key pointer and value. The setpoint values for procedure E0, steps 1, substeps a and b, are 50 and 1000 respectively. These values will be converted into character strings and substituted into the state equation character string.

Once the state equation character string is stored in the variable character string, the result is an equation for procedure E0, step 1, substep a. The concantenated equation in the variable character string is then stored 320 in a file (not shown) which will be sent to a compiler and a parser once all the equations have been generated. The functions performed by the compiler, the parser, yacc, and lex will be described later in this application.

After the variable character string is stored in a file 320, the next procedure and step number are read and compared to the prior procedure and step number 304. If the result of the comparison is true, then all of the singular equations for the procedure/step have been generated. Therefore, the composite equation is then stored in the file 308 and set to "null" 310.

Equations representing procedure E0, step 1, substeps b and c are generated in the same manner as described above for substep a. In fact, all the singular and composite equations for each entry condition, procedure/step and parallel information are generated by the same method described above. The resulting singular and composite equations character strings for procedure E0, step 1 are shown in FIG. 5.

The result of each of the singular equations will be either true or false. This result will aid in determining whether a nuclear power facility is operating correctly. The evaluation of the composite equation shown in FIG. 5 represents whether a steam generator tube has ruptured for the procedure describe in FIG. 2A. If the result of the evaluation is true, this may signal a warning or violation message indicating what procedure to execute in order to correct the rupturing of the steam generator, such as shut off the pump or decrease the pressure level.

After each equation is built by equation builder 204, compiler 206 begins reading the file containing all the singular and composite equations character strings from Equation Builder 204. Parser 208 together with the powerful UNIX™ utilities lex 122 and yacc 124, compiles stacks 210 and tables 214 and 216. Parser 208 parses the equations which have been generated as strings by equation builder 204. The Parser 208 can handle both simple and sophisticated expressions. One having ordinary skill in the art can use commercially available UNIX utilities lex and yacc to parse and compile strings.

The UNIX™ utility lex 122 is used to define "tokens" recognized by parser 208. These tokens include the different types of allowable variables, operators (i.e., =, +, −, *, /, <, >, etc), functions and built-in constants. The other UNIX™ utility yacc 124 provides a general tool for defining the rules and structure for an input stream or user-defined equations. Lex 122 is a low level routine used by yacc 124 to select the tokens from the user-defined equations 202 to organize them according to the input structure rules. Thus, when yacc 124 recognizes the rules in system-defined equations, the compiler 206 calls the lex 122 and yacc 124 based functions to generate the program stack 210, entry point table 214 and symbol table 216.

The compiler keeps using parser 208, lex 122 and yacc 124 to operate on each respective equation. Note that the character string equations generated by equation builder 204 have no predetermined content, but are determined by the system designer of the nuclear power plant. The compiler follows the order introduced by the predefined logic, which is a key to the system flexibility.

The compiler, using conventional operations, creates a symbol table 216, a program stack 210 and an entry point table. The program stack 210 for the singular equation and the composite equation of FIG. 5 is shown in FIG. 6. As can be seen the first entry for an equation is the label for the location where the result is stored. Next is the logical operator and the remaining two entries are the operands. A similar arrangement exists for the composite equation, where all logical operators are given first followed by the operands as shown in FIG. 6.

As discussed above, the program stack 210 contains executable instructions referred to here as pseudo-instructions and operand names. These pseudo-instructions include (i) operators or requests to execute a set of primitives consisting of operators, as well as any library functions; (ii) requests to run other user defined program segments; and (iii) requests to push addresses or values onto a context stack 212 from the symbol table.

The entry point table 214 contains pointers to the program stack at the end of compilation. The entry point pointers point to parallel information equations, entry condition equations and procedure/step equations. The symbol table 216 contains pointers to temporary variables, constants and built-in functions. The process procedures 118 shown in FIGS. 1 and 7 executes and evaluates the equations stored on the program stack 210 in accordance with the context stack 212, the entry point table 214 and the symbol table 216.

Figure 7:
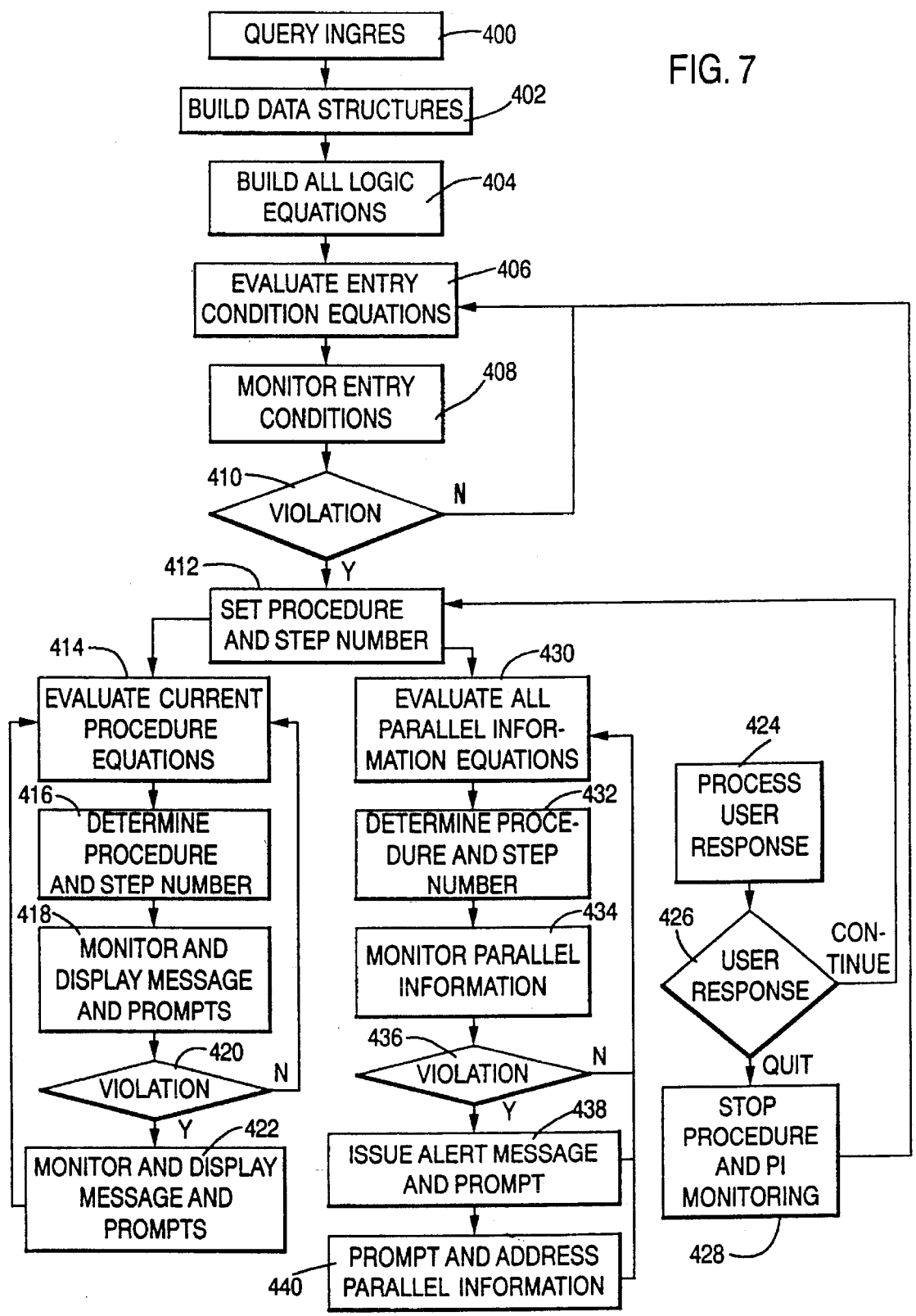
FIG. 7 is a block diagram of the flow of the generating and execution of complex operating procedures.

FIG. 7 is a flowchart of the on-line processing executed by software module Process 118. Data structure Builder 200 accesses 400 and copies the relational database stored on the disk storage device 110 to local memory 402. Equation Builder 204 generates 404 all of the logic equations through the method illustrated in FIGS. 3 and 4.

Entry condition equations are evaluated first 406 by determining whether each of the entry condition singular equations and composite equations are true or false. The evaluation or execution of the equations is performed using the entry point table 214, the program stack 210, the context (data) stack 212 and the symbol table 216. The execution starts with the entry point table 214 which points to the starting point for entry condition equations. The equations are evaluated or executed, for example, using a conventional reverse polish notation type stack execution method. For example, the program stack as illustrated in FIG. 6 is used to execute singular equations E0:1:a, E0:1:b and E0:1:c and the composite equation illustrated in FIG. 5. During this execution the symbol table 216, which is a cross reference from the variable name to the storage location for that variable is used to obtain the actual values of the variables for execution and to store the results. The data stack 212 is used to store retrieved variables and intermediate results.

At this point only the entry condition equations are evaluated to determine whether a violation of the facility 410 has occurred. If no violation has occurred, the evaluation of the entry condition equations 406 and monitoring of the result of the evaluation 408 will continue until a condition violation exists at the nuclear power facility to signal a malfunction. System design specialists determine what entry condition equations are needed to signal a violation. These equations are developed in advance by system design specialists and are dependent upon what facility is being monitored, such as a nuclear power facility, a coal-fired power facility or a chemical processing facility.

Figure 8:
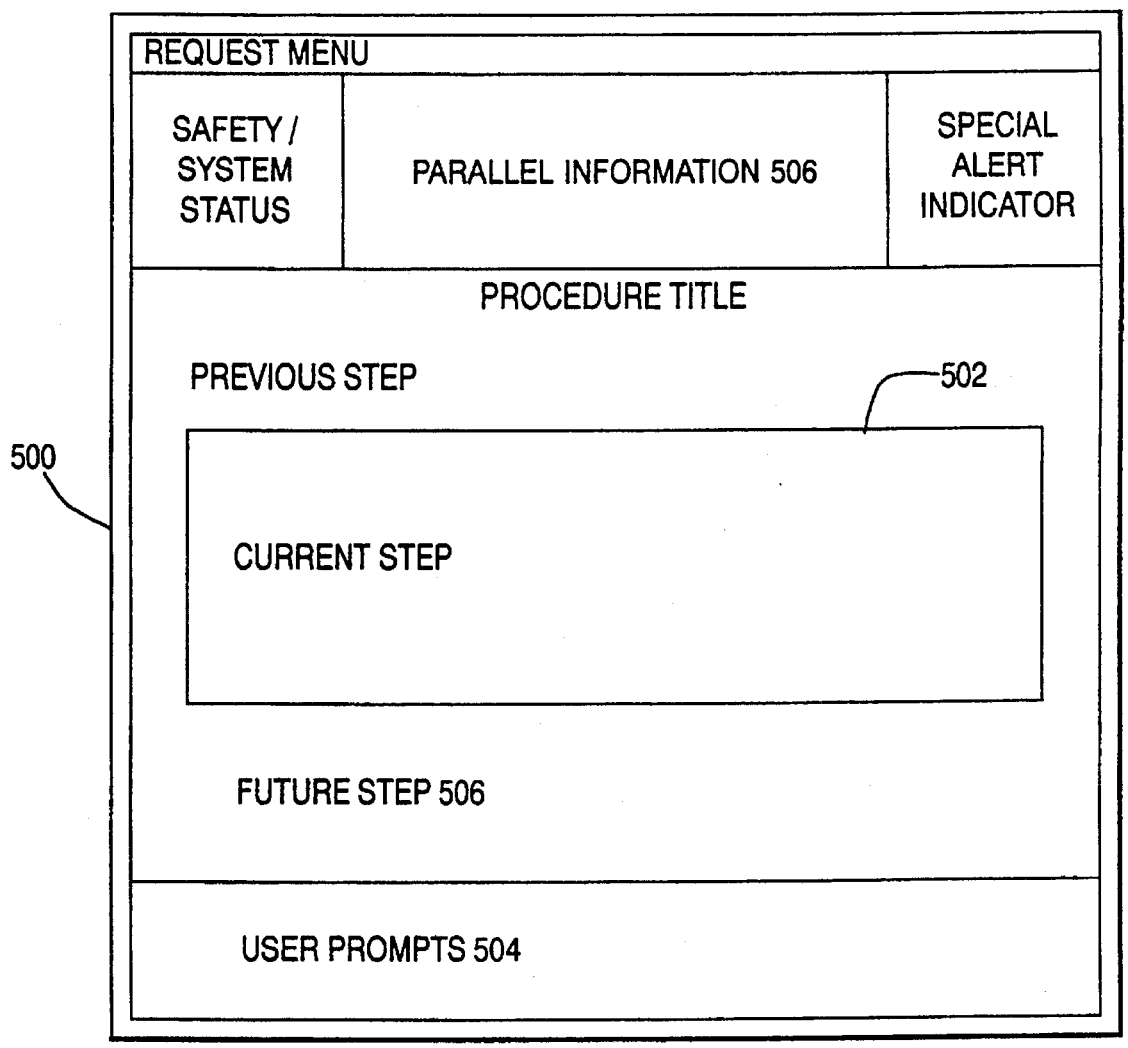
FIG. 8 illustrates where information is displayed on a display screen.

Once a violation occurs 410 as indicated by all the entry condition equations for one of the procedures, the procedure and step number are set 412 based on the procedure header. The procedure is then obtained and displayed to the operator. For example, if all of equations a, b, and c are true as shown in FIG. 8, then procedure E0, step 1, will be executed because equations a, b and c follow procedure header E0 step 1 on the program stack 210. For example, procedure E0, step 1 may call for turning off pump A and if so, a message is sent to the plant operator via a display screen is displayed telling the operator to turn off pump A. Similarly, if all of the parallel information equations that follow procedure E1 are evaluated to be true, then procedure E1 would be executed.

Once the procedure and step number are set 412, all of the equations associated with the procedure are evaluated 414. The evaluation procedure is the same as described previously with respect to evaluating entry condition equations. The current procedure and step number are determined 416 to indicate what step of what procedure is currently being executed. This determination is made by referring to the current procedure and step number stored in local memory.

Only those equations associated with the step are monitored 418, although all of the equations for the procedure step have been evaluated 414. Monitoring involves continuously reviewing the equations and producing the associated message until the conditions which caused the message disappear or the operator overrides the message. None of the other results of the steps are monitored although the equations associated with these steps have been evaluated (executed).

The action steps of the procedure are displayed 418 in display device 500 at the current step box 502 as illustrated in FIG. 8. Text displayed in the current step box 502 is the expected action or response by the facility operator. Each step contains a high-level statement which describes the task to be performed. If the high-level task (step) requires multiple actions, then subtasks (substeps) are specified. Following each task or subtask, the expected response or result is given. Action steps are written so that the facility operator can proceed directly down the list. This display contains all the expected conditions, and checks required to accomplish the stated purpose of the procedure, or what course of action a facility operator should perform.

A prompt is displayed 418 which indicates what recommended course of action the facility operator should take. Prompts are displayed as shown in FIG. 8 at the location of user prompts 504. The prompt will be continuously displayed until the operator addresses the prompt 424.

Along with displaying the action steps and prompts 418, the step is checked to determine whether the expected response was obtained. If the expected response is not obtained, then a violation exists and the output device 106 displays contingency instructions 422 in the current step box 502 shown in FIG. 8. The display also displays in the current step box 502 whether the recommended response chosen by the facility operator was not obtained. Almost all action steps displayed in current step box 502 contain some contingency action statement. If a contingency is not provided, then the system proceeds to the next step or substep that is displayed at future step 506 shown in FIG. 8, and the current procedure equations are again evaluated 414.

A user response is required before the system will advance to the next step or procedure. A prompt is displayed at user prompts 504 shown in FIG. 8 which recommends the step to execute 418 or 422 to which the facility operator can respond. Once the facility operator responds 424, the response is checked to determine whether the operator wants to continue with the recommended course of action. If the facility operator desires to continue with the indicated course of action, for example, the next relevant step or part of the procedure, as displayed by the prompt 418 or 422, the displayed procedure and step number are set to the indicated values 412. If the facility operator chooses to quit the monitoring of the current procedure 428, the program returns to evaluating and monitoring entry conditions 406.

All parallel information equations are concurrently evaluated 430 with the evaluation and monitoring of the current procedure step equations. Once again, evaluation is performed as previously discussed with respect to evaluating entry condition equations. Parallel information includes, for example, Notes, Cautions, Foldout Pages, and parameter and component state changes which have been initiated but not completed upon exiting the currently active procedure step. Parallel information also includes global or continuously controlled parameters which need to be monitored for more than a single procedure step, for example, maintaining a steam generator level at a certain value. Parallel information equations are stored in the relational database and generated in a similar manner as the procedure/step equations shown in FIGS. 2A and 2B.

The procedure and step number will be determined 432 in a similar manner as described above so that parallel information that is executed is associated with the currently executing step. Some parallel information is global and will always be evaluated. If a completed procedure step (or substep), a Note or Caution involves a parameter which should be continuously controlled 432, the system will monitor that parameter 434 until any of the associated equations is evaluated to false.

The result of the evaluation of the parallel information equations is monitored 434 to determine if a violation has occurred 436. If all of the associated equations for a procedure in the parallel information are true, then a violation has occurred for that procedure. If a violation has occurred in the parallel information 436, an alert message is issued to an operator at parallel information 506 shown in FIG. 8 and a prompt is displayed 438 at user prompts 504 which gives the recommended course of action the operator should take. The evaluation of the parallel information equations will continue 430 despite the violation after the prompt is displayed 438 at user prompts 504 shown in FIG. 8.

The facility operator will have complete control over the operation of the COMPRO system. The system will not advance to the next step or procedure for any reason without the concurrence by the facility operator. The procedure/step and parallel information loops are executing concurrently. Prompts are displayed 418, 422 and 440 which indicate the corrective procedure and step to execute. The system will wait for a facility operator response; however, the procedure/step and parallel information loops will continue to execute in parallel. Only after the facility operator responds to the displayed prompt 424, 426 at user prompt 504 shown in FIG. 8, will the system advance to the next step or procedure. If the operator quits the procedure, the procedure and parallel information monitoring is halted 428 and the system returns to evaluating and monitoring the entry condition equations for a system violation 406.

The many features and advantages of the invention are apparent from the detailed specification and thus it is intended by the appended claims to cover all such features and advantages of the invention which fall within the spirit and scope of the invention. Further, since modifications and changes will inevitably occur to those skilled in the art, this invention is not limited to the exact construction and operation illustrated and described. Accordingly, all suitable modifications and equivalents may be resorted to, falling within the scope of this invention. Moreover, although the invention has been explained in the context of monitoring a nuclear power plant, it can be appreciated that the invention can be readily adapted for the application of other type of power plants or complex operating facilities.

We claim:

1. A method for monitoring an operation of a facility, the method comprising the steps of:
   (a) inputting parameters including representations of operating conditions in the facility, generating a composite equation from the parameters, and compiling a program stack on-line from the composite equation which has a dynamic relationship based upon the parameters; wherein said parameters including representations of operating conditions in the facility are stored in a relational database; wherein the dynamic relationship is defined when the composite equation is generated; and wherein the composite equation represents a condition in the operation of the facility; and
   (b) executing the program stack to determine whether a determined violation exists in the operation of the facility; wherein the determined violation is an abnormal condition in the operation of the facility.

2. A method as recited in claim 1, further comprising the step of:
   (c) producing a violation message indicating a procedure to be performed to correct the determined violation.

3. A method as recited in claim 1, wherein step (a) includes the substeps of:
   (a1) generating the composite equation including a plurality of singular equations;
   (a2) parsing each of the singular and composite equations into executable code; and
   (a3) compiling the executable code onto the program stack.

4. A method as recited in claim 1, wherein step (a) includes the substeps of:
   (a1) retrieving the parameters from the relational database;
   (a2) identifying a logic relationship from the parameters;
   (a3) concatenating the parameters to form singular equations; and
   (a4) generating the composite equation by concatenating each of the singular equations together by the logic relationship.

5. A method as recited in claim 4, wherein the parameters include a plurality of descriptors, a plurality of states and a plurality of setpoints, and wherein step (a3) includes the substep of:
   concatenating one of the descriptors, a corresponding one of the states and a corresponding one of the setpoints to form a singular equation.

6. A method as recited in claim 1, further comprising the step of:
   (c) generating data structures by copying the parameters stored in the relational database into local memory.

7. A method as recited in claim 1, further comprising the steps of:
   (c) evaluating entry condition equations until the determined violation occurs; and
   (d) determining a procedure from a plurality of procedures to correct the determined violation once the determined violation occurs.

8. A method as recited in claim 7, wherein each of the procedures includes a plurality of steps each of which includes a plurality of equations, the method further comprising the steps of:
   (e) evaluating all the equations associated with the procedure;
   (f) determining one of the steps for the procedure being executed; and
   (g) monitoring the equations associated with the step to determine whether the procedure has been followed.

9. A method as recited in claim 1, further comprising the steps of:
   (c) generating entry condition equations;
   (d) evaluating the entry condition equations to determine if an initial violation has occurred;
   (e) monitoring the entry condition equations to automatically determine a procedure of a plurality of procedures which will correct the determined violation; and
   (f) repeating steps (d) and (e) until the determined violation occurs.

10. A method as recited in claim 9, further comprising the step of:
    (g) executing the procedure when the determined violation occurs.

11. A method as recited in claim 9, wherein each of the procedures includes a plurality of steps and each of the steps includes a plurality of equations, the method further comprising the steps of:

(g) determining a step of the steps of the procedure which should be executed;

(h) evaluating all the equations of all the steps of the procedure;

(i) monitoring a result of the equations of the step; and (j) determining whether a step violation occurred which indicates that the step was not executed.

12. A method as recited in claim 11, further comprising the step of:

(k) displaying a message if the step violation occurred.

13. A method as recited in claim 11, wherein a facility operator controls operation of the facility, the method further comprising the steps of:

(k) displaying a first prompt which tells the facility operator a step that should be executed; and (l) determining whether the facility operator executed the step that should be executed.

14. A method as recited in claim 9, wherein each of the procedures includes a plurality of steps and each of the steps includes a plurality of equations, the method further comprising the steps of:

(g) determining a step of the steps of the procedure which should be executed;

(h) evaluating all parallel information equations;

(i) monitoring the parallel information equations associated with the step and the parallel information equations which are always evaluated; and (j) determining whether the determined violation of the facility occurs from a result of the monitoring in step (i).

15. A method as recited in claim 14, wherein a facility operator controls operation of the facility, the method further comprising the steps of:

(k) issuing an alert if the determined violation occurs;

(l) displaying a prompt if there is the determined violation; and (m) waiting for a response by the facility operator to correct the determined violation.

16. A method as recited in claim 1, further comprising the steps of:

(c) evaluating entry condition equations to determine an initial violation;

(d) evaluating procedure equations to determine a procedure/step violation; and (d) evaluating procedure equations to determine a procedure/step violation; and (e) evaluating parallel information equations concurrently with step (d) to determine a parallel information violation.

17. A method as recited in claim 16, further comprising the steps of:

(f) displaying a message and a prompt if the initial violation, the step violation or the parallel information violation occurs; and (g) concurrently and continuously evaluating the procedure equations and the parallel information equations until a response to the prompt is made.

18. A method as recited in claim 17, wherein a facility operator controls operation of the facility, the method further comprising the steps of:

(h) halting the evaluation of the procedure equations and the parallel information equations if the facility operator quits execution; and (i) evaluating the entry condition equations again once the facility operator quits execution.

19. A method for monitoring an operation of a power plant facility, the method comprising the steps of:

(a) inputting parameters including representations of operating conditions in the facility; generating entry condition equations, procedure step equations and parallel information equations from the parameters; and producing a program stack on-line from the equations which have a dynamic relationship based upon the parameters; wherein said parameters including representations of operating conditions in the facility are stored in a relational database; wherein the dynamic relationship is defined when the equations are generated; and wherein the equations represent conditions in the operation of the facility;

(b) executing the program stack in order to evaluate the entry condition equations and determine if an initial violation has occurred, wherein the initial violation is an abnormal condition in the operation of the facility;

(c) monitoring the entry condition equations to automatically determine a procedure of a plurality of procedures which will correct the initial violation;

(d) repeating steps (b) and (c) until the initial violation occurs;

(e) determining a step of steps of the procedure which should be executed to correct the initial violation;

(f) executing the program stack in order to evaluate all equations of all of the steps of the procedure;

(g) monitoring a result of the procedure step equations corresponding to the step;

(h) determining whether a procedure step violation occurred, wherein the procedure step violation is an abnormal condition in the operation of the facility;

(i) providing a procedure step message if the procedure step violation occurred;

(j) executing the program stack in order to evaluate all of the parallel information equations simultaneously with executing steps (e)–(i);

(k) monitoring the parallel information equations associated with the step and the parallel information equations;

(l) determining whether a parallel information violation of the facility occurs from a result of the monitoring in step (k), wherein the parallel information violation is an abnormal condition in the operation of the facility; and (m) providing a parallel information violation message if the parallel information violation occurs.

20. A system for monitoring and controlling operation of a facility, the system comprising:

relational database means for storing parameters including representations of operating conditions in the facility;

means for inputting the parameters from the relational database means;

means for generating a composite equation from the parameters and for compiling a program stack on-line from the composite equation which has a dynamic relationship based upon the parameters; wherein the dynamic relationship is defined when the composite equation is generated; and wherein the composite equation represents a condition in the operation of the facility; and means for executing the program stack to determine whether a determined violation exists in the operation of the facility; wherein the determined violation is an abnormal condition in the operation of the facility.

21. A system as recited in claim 20, wherein said executing means further comprises:

means for determining how to correct the determined violation and for providing corrective action messages; and means for displaying the corrective action message.

22. A system as recited in claim 20, wherein said relational database means includes:

disk storage means for storing the parameters; and means for reading the parameters from said disk storage means.

* * * * *